May 7, 1929.   F. B. BELL ET AL   1,711,769
AUTOMATIC CHUCK FOR INGOT SLICING LATHES
Filed July 14, 1924   2 Sheets-Sheet 1
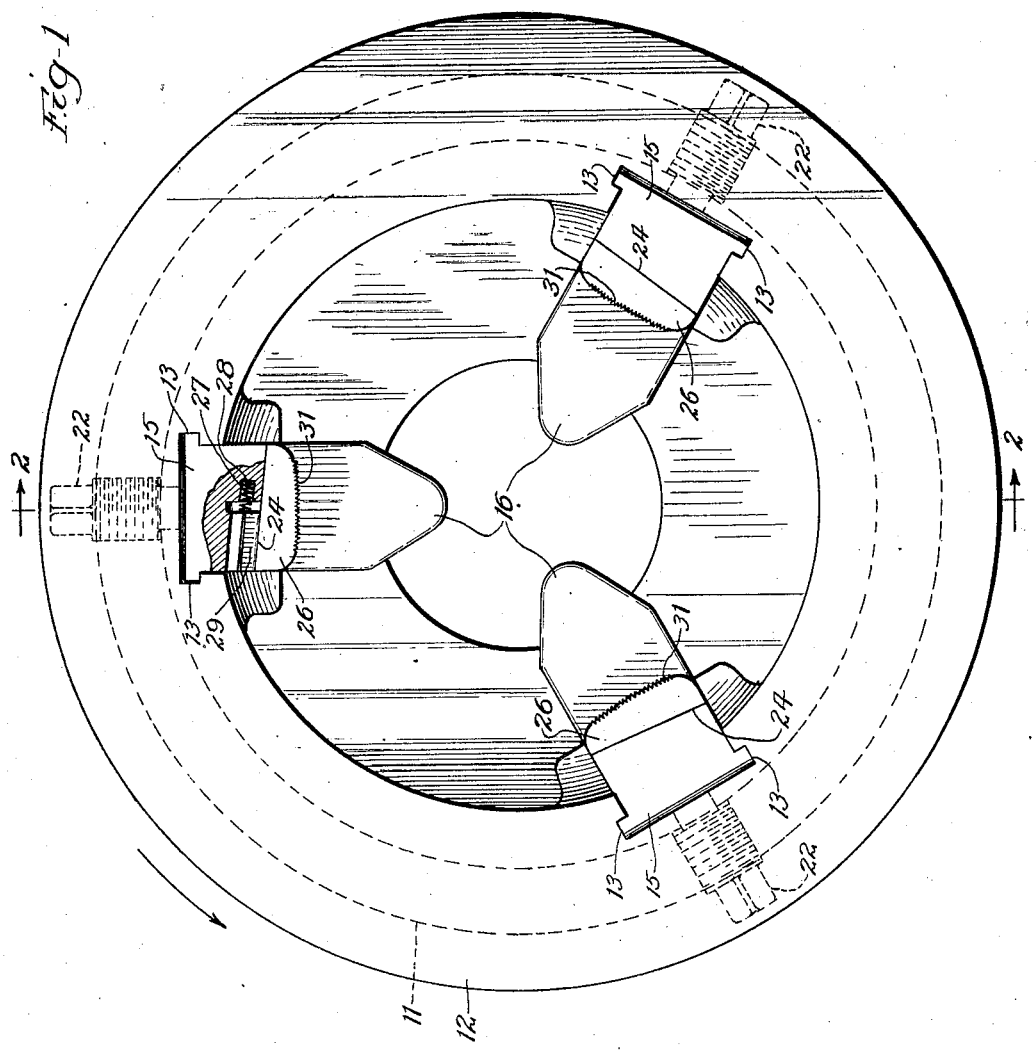

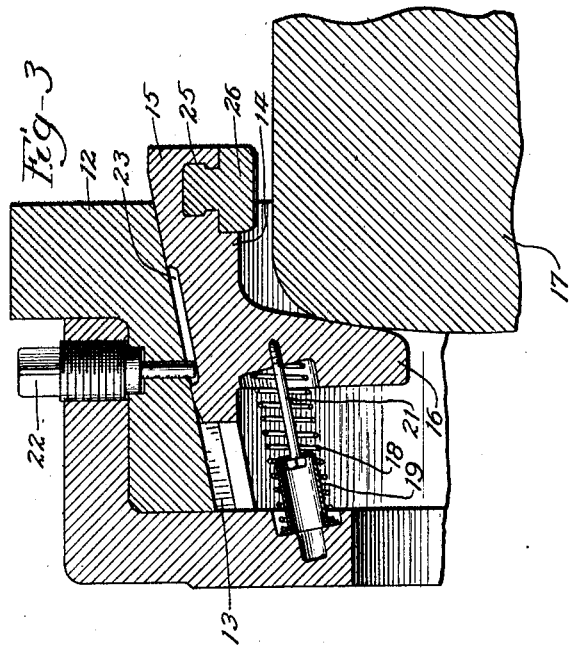
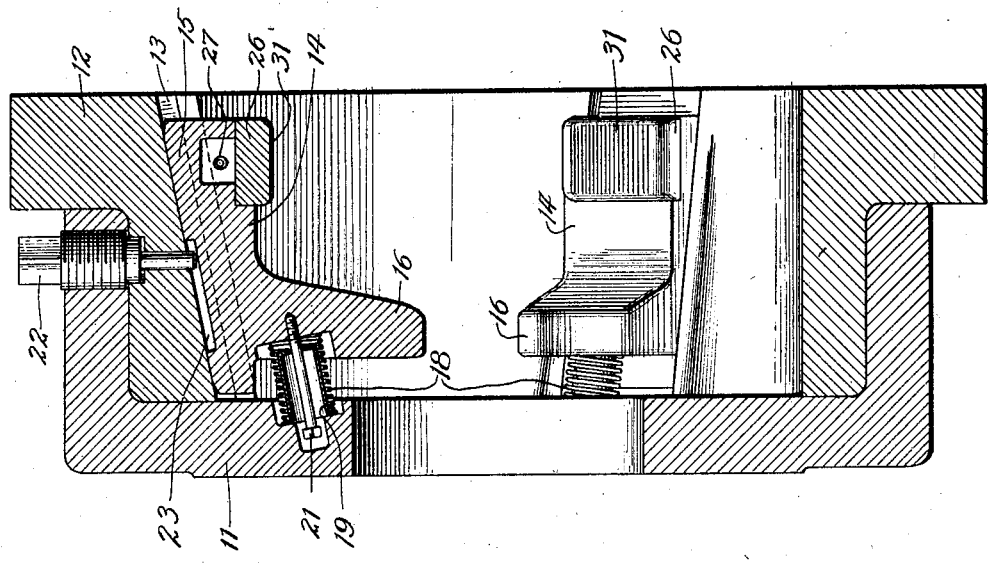

Patented May 7, 1929.

1,711,769

UNITED STATES PATENT OFFICE.

FRANK B. BELL AND JOHN C. CROCKER, OF PITTSBURGH, PENNSYLVANIA, ASSIGNORS TO EDGEWATER STEEL COMPANY, OF PITTSBURGH, PENNSYLVANIA, A CORPORATION OF PENNSYLVANIA.

AUTOMATIC CHUCK FOR INGOT-SLICING LATHES.

Application filed July 14, 1924. Serial No. 725,777.

This invention relates to chucks for lathes and the like, and has for its object, broadly, the provision of a chuck of automatic action which will tightly grip an article thrust therein and free the same without the necessity of tightening chucking members against the article by the manipulation of set screws, bolts and other usual fastening devices.

A special use of the invention, but of course by no means the only use, is in connection with the slicing or cutting of heavy cast ingots for the making of blanks for car wheels and the like. These ingots are about 90 inches long, the top end of which in the casting is tapered slightly. In accordance with previous practice an ordinary bell chuck was employed. The chuck on the head stock was provided with large set screws and a chuck at the tail stock was provided with three stationary heavy jaws. The tapered end of the ingot was placed in the tail stock and the tail stock transversed toward the head stock to cause the three stationary jaws to grip the tapered end of the ingot, the centering and holding power of these jaws being sufficient for the tail stock end. It was necessary, however, to tighten from three to six large set screws in the head stock or driving chuck in order to center and hold the ingot at this end. A lathe for this purpose is provided with a 100 H. P. motor and a large number (as many as 18 or 20) cutting tools are employed at a time.

This circumstance renders it necessary for the ingot to be very tightly held by the set screws and the practice has been to tighten these set screws by engaging with a short wrench and turning the wrench with a sledge hammer.

The invention has for a further object the provision of a chuck which will be entirely automatic in its action and will engage the ingot tightly in chucking and centered position by the mere movement into the chuck and the rotation of it for cutting or other operation.

Another and highly important object of the invention is the provision of a chuck of this character, which will automatically free itself of the part held therein upon the mere movement of said part axially away from the chuck.

Numerous other objects and advantages of the invention will be apparent as it is better understood from the following description, which, taken in connection with the accompanying drawings, discloses a preferred embodiment thereof.

Referring to the drawings,

Figure 1 is a front elevation of a chuck embodying the present invention;

Fig. 2 is a section taken substantially on the line 2—2 of Fig. 1; and

Fig. 3 is a partial view taken similarly to Fig. 2 and showing the parts in slightly different arrangement.

The chuck shown on the drawing and disclosing a preferred embodiment of the invention, comprises a body which is or may be composed of the usual bell 11, and inserted annular member 12. The annular member 12 is provided with three slide-ways 13 of T shape. These slide ways are inclined toward the axis of the chuck. A slide 14 is provided in each slide way. Each slide 14 has a body part 15 matching in cross section its slide way 13 and has also a tail portion 16 extending radially in toward the axis of the chuck into position to be engaged by the end of the ingot or other article 17 as may be seen in Fig. 3. A spring 18 is arranged between the tail or inwardly extending portion 16 of the slide and the bell body behind it. This spring embraces a thimble 19 through which is arranged a bolt 21 to hold the spring in place and guide it in its action. A set screw 22 is arranged through the bell and annular member 12 into a slot 23 in the body of the slide to limit the outward movement of the slide into position for engagement by the article.

Referring to Fig. 1 it will be noted that the outer end of the slide body is provided with an inclined face 24 upon the side adjacent the axis of the chuck, the inclination being away from the axis in the direction of rotation. A T-slot 25 is indicated in Fig.

3 and is arranged part way across the slide back of this face and in this slot is mounted a gripper or clutching member 26.

A spring 27 is inserted in a recess 28 in the slide and bears against a T-portion 29 arranged in the T-slot 25 already mentioned.

When the ingot or other article 17 is thrust into the chuck it engages the three ends or parts 16 of the slides and moves the slides axially and along the slide ways, the inclination of which causes the slides to move radially in toward the axis of the chuck and into tight engagement with the sides of the ingot or other article. This accomplishes the centering of the ingot automatically, without rotating the lathe or ingot. Upon rotation of the chuck the clutching members 26, the faces of which are preferably serrated or roughened, tend to lag with the article and in so lagging slide along the inclined faces 24 of the slides into powerful clutching relation with the ingot.

When it is desired to free the chuck of the article, the article need only be pulled axially away from the chuck, the slides moving with the article under the force of the springs 19 and lifting the gripping or clutching members 26 away from the engaged faces of the ingot. It is therefore apparent that although the clutching members attain their final gripping action by sliding across the face of the slides as the chuck is initially rotated, it is not necessary to reverse this action to release the engagement.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A chuck, comprising, a body and members carried by said body and adapted to be actuated by a part being chucked, said members being movable bodily axially and circumferentially of said chuck body into gripping engagement with the part being chucked.

2. A chuck, comprising, a body and members carried by said body and for engagement with the part to be chucked, said members being automatically slidably movable bodily axially and circumferentially of said chuck body into gripping engagement with the part being chucked.

3. A chuck, comprising, a body, slideways in said body and inclined toward the axis of the chuck, slides mounted in said slide ways, and gripping members carried by said slides and slidably movable bodily circumferentially across the same into tight chucking relation with the article thrust into the chuck upon rotation of said article and chuck.

4. A chuck, comprising, a body, slide ways in said body and inclined toward the axis of the chuck, slides mounted in said slide ways, and gripping members mounted in said slides and slidably bodily movable relative thereto into tight engagement with an article in said chuck, said movement occurring as an incident to the rotation of the article.

5. A chuck, comprising, a body, inclined slide ways therein, slides mounted in said slide ways and having parts for engagement with an article being chucked to move said slides with said article, gripping members mounted in said slides and movable relative thereto into tight gripping engagement with said article, and spring members for causing said slides to move with the article back to the initial position when the article is withdrawn.

6. A chuck, comprising, a body, inclined slide ways therein, slides mounted in said slide ways and having parts for engagement with an article being chucked to move said slides with said article, spring members for causing said slides to move with the article back to the initial position when the article is withdrawn, and gripping members mounted in said slides and slidably movable relative thereto into gripping engagement with said article by engagement therewith.

7. A chuck, comprising, a body into which an end of the article to be chucked may be inserted, gripping members in said body for engaging said article and having first an axial movement into gripping relation and thereafter a circumferential movement with respect to said body for tightening gripping engagement with said article.

8. A chuck, comprising a body adapted to receive the end of an article to be chucked, and gripping members mounted within the body and having both axial and circumferential movements into final gripping engagement, said gripping members releasing said body through merely an axial relative movement with respect thereto.

9. A chuck, comprising a body, inclined slide ways therein, slides mounted in said slide ways and having parts for engagement with an article being chucked to move said slides with said article, gripping members mounted in said slides and wedgeably movable relative thereto into tight gripping engagement with said article, and spring members adapted to return said gripping members to a normal disengaged position after the removal of the article from the chuck.

10. A chuck, comprising a body, inclined slide ways therein, slides mounted in said slide ways having projecting fingers adapted to engage an article being chucked to move said slides with the article, spring members for causing the slides to move to a normal open position as the article is withdrawn, gripping members mounted in said slides and bodily movable relative thereto into tight gripping engagement with the said article and spring members mounted within said slides adapted to return the gripping members to an open unchucked position as the said article is withdrawn.

FRANK B. BELL.
JOHN C. CROCKER.